United States Patent
Joung et al.

(10) Patent No.: US 9,680,586 B2
(45) Date of Patent: Jun. 13, 2017

(54) METHOD OF CONTROLLING TDD TX/RX SWITCHING TIMING IN CLOUD RADIO ACCESS NETWORK

(71) Applicant: INNOWIRELESS CO., LTD., Gyeonggi-do (KR)

(72) Inventors: Jin-Soup Joung, Gyeonggi-do (KR); Joo-Hyeong Lee, Seoul (KR); Tae-Beom Kim, Gyeonggi-do (KR)

(73) Assignee: INNOWIRELESS CO., LTD., Gyeonggi-Do (KR)

( * ) Notice: Subject to any disclaimer, the term of this patent is extended or adjusted under 35 U.S.C. 154(b) by 302 days.

(21) Appl. No.: 14/284,445

(22) Filed: May 22, 2014

(65) Prior Publication Data

US 2015/0295699 A1  Oct. 15, 2015

(30) Foreign Application Priority Data

Apr. 15, 2014  (KR) ........................ 10-2014-0044939

(51) Int. Cl.
| | |
|---|---|
| *H04J 3/06* | (2006.01) |
| *H04L 5/00* | (2006.01) |
| *H04L 5/14* | (2006.01) |
| *H04L 27/26* | (2006.01) |
| *H04J 3/04* | (2006.01) |

(52) U.S. Cl.
CPC ............ *H04J 3/0682* (2013.01); *H04J 3/047* (2013.01); *H04L 5/0078* (2013.01); *H04L 5/1469* (2013.01); *H04L 27/26* (2013.01); *G09G 2370/14* (2013.01)

(58) Field of Classification Search
CPC ... H04L 5/1469; H04L 7/0016; H04L 5/0078; H04L 27/26; H04J 3/047
See application file for complete search history.

(56) References Cited

U.S. PATENT DOCUMENTS

| | | | | |
|---|---|---|---|---|
| 2009/0092117 A1* | 4/2009 | Jiang | ...................... | H04W 88/10 370/342 |
| 2009/0245228 A1* | 10/2009 | Osterling | .............. | H04J 3/0638 370/350 |
| 2011/0032910 A1* | 2/2011 | Aarflot | .................. | H04J 3/0682 370/335 |
| 2013/0163524 A1* | 6/2013 | Shatzkamer | ............ | H04L 69/22 370/329 |
| 2014/0105101 A1* | 4/2014 | Vu | ........................ | H04L 1/0008 370/328 |

\* cited by examiner

Primary Examiner — Omer S Mian
(74) Attorney, Agent, or Firm — Kaplan Breyer Schwarz, LLP

(57) ABSTRACT

Provided is a method for controlling a time division duplexing (TDD) Tx/Rx switching timing in a cloud radio access network (CRAN) that can finely control a switching timing between transmission and reception of TDD signals with an additional component added to a digital unit (DU) and a radio unit (RU) in the CRAN.

4 Claims, 6 Drawing Sheets

METHOD OF CONTROLLING TDD TX/RX SWITCHING TIMING IN CLOUD RADIO ACCESS NETWORK

CROSS-REFERENCE TO RELATED APPLICATION

This application claims priority to and the benefit of Korean Patent Application No. 10-2014-0044939, filed on Apr. 15, 2014, the disclosure of which is incorporated herein by reference in its entirety.

BACKGROUND

1. Field of the Invention

The present invention relates to a method for controlling a time division duplexing (TDD) Tx/Rx switching timing in a cloud radio access network (CRAN), and more particularly, to a method for controlling a TDD Tx/Rx switching timing in the CRAN that can finely control a switching timing between transmission and reception of TDD signals without an additional component added to a digital unit (DU) and a radio unit (RU).

2. Discussion of Related Art

Recently, a centralized/cloud radio access network (CRAN) structure has been widely introduced into base station systems. In the CRAN structure, a digital unit (DU) and a radio unit (RU) of a base station system are separately implemented in order to reduce capital expenditure (CAPEX) and operational expenditure (OPEX) and also secure efficiency in the development of an apparatus.

In the CRAN, typically, DUs are mainly positioned in a DU center provided in a telecommunication office while RUs are installed in a service area that is spaced apart from the DU center. For high-speed transmission and reception of baseband I/Q signals, DUs and RUs are physically connected by an optical link or unshielded twisted pair (UTP) cable.

At present, one of the standards that are most widely used to transmit and receive I/Q data between the DU and the RU is a common public radio interface (CPRI). Further, version 6.0 of the standard may support a maximum line bit rate of 10,137.6 Mbps.

Standards similar to the CPRI include an open baseband remote radiohead interface (OBSAI) defined prior to the CPRI and an open radio interface (ORI) that is a lower standard. For convenience, the CPRI standard will be described below as an example. However, it is natural that OBSAI and ORI are not excluded.

FIGS. 1a to 1d show several connection forms of the CRAN that may be supported by the CPRI specification. FIG. 1a shows the simplest configuration in which one radio equipment control (REC) corresponding to the above-described DU and one radio equipment (RE) corresponding to the above-described RU are connected by a single CPRI link. FIG. 1b shows a configuration in which one REC and one RE are connected by a plurality of CPRI links in order to enhance performance. FIG. 1c shows a star topology configuration in which one REC and one RE are connected by one or more CPRI links. FIG. 1d shows a chain topology configuration in which one REC is connected to one RE by one or more CPRI links and the other RE is connected to the RE by one or more CPRI links. According to the CPRI standard, various configurations such as a tree topology or ring topology other than a described-above configuration may be used to connect the REC and the RE.

In WiMAX and E-UTRA time division duplexing (TDD) environments, a switching timing between transmission and reception of the downlink and uplink signals should be finely controlled. When the DU and RU are installed at the same place, the TDD Tx/Rx switching timing may be controlled relatively easily.

However, in the CRAN in which the DU and RU are spaced apart from each other and a plurality of RUs are connected with one DU by cables having different lengths, it is difficult to finely control the TDD Tx/Rx switching timing due to all the circumstances (for example, where link delays between the DU and respective RUs are different). Of course, the TDD Tx/Rx switching timing may be controlled using each GPS device provided in the DU and all of the RUs. In this case, it is difficult to satisfy a criterion of up to ±16.276 ns in a multi-hop environment because the production cost increases significantly and also an error of tens of nanoseconds or more is inevitable.

SUMMARY OF THE INVENTION

The present invention is directed to a method of controlling a TDD Tx/Rx switching timing in a cloud radio access network (CRAN) that can finely control a switching timing between transmission and reception of time division duplexing (TDD) signals without an additional component added to a digital unit (DU) and a radio unit (RU).

According to an aspect of the present invention, there is provided a method of controlling a TDD Tx/Rx switching timing in the CRAN in which at least one RU including a RU_CPRI_OBSAI_frame_timer and an RU_WiMAX_E-UTRA_frame_timer is connected with a DU having a DU_CPRI_OBSAI_frame_timer and a DU_WiMAX_E-UTRA_frame_timer, the method including: determining, by each RU, a boundary of a wireless frame signal transmitted from the DU to synchronize the RU_CPRI_OBSAI_frame_timer with the DU_CPRI_OBSAI_frame_timer, the DU being connected with each RU; updating, by each RU, the RU_CPRI_OBSAI_frame_timer based on link delay information delivered from the DU; updating, by each RU, WiMAX_E-UTRA frame timing information based on information about a difference between a CPRI_OBSAI frame timing and a WiMAX_E-UTRA frame timing, delivered from the DU; and controlling a TDD Tx/Rx switching timing by replacing Tx/Rx switching timing information for each antenna carrier AxC delivered from the DU to the RU_CPRI_OBSAI_frame_timer and the RU_WiMAX_E-UTRA_frame_timer.

The determining of the boundary may include checking the boundary of the wireless frame signal using a sync&timing subchannel for each hyper frame of the wireless frame signal transmitted from the DU.

Each of the CPRI_OBSAI_frame_timer and WiMAX_E-UTRA_frame_timer may be configured using a timer with an error of less than 10 ns.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Preferred embodiments of a method of controlling a time division duplexing (TDD) Tx/Rx switching timing in a cloud radio access network (CRAN) will be described in detail below with reference to the accompanying drawings.

As described above, the terms "DU" and "RU" are widely used in the CRAN while the terms "REC" and "RE" are used corresponding to the DU and RU in a common public radio interface (CPRI) which is one of the interfaces used in the CRAN. Hereinafter, the present invention will be described using these terms interchangeably.

As well known, the CPRI standard may be applied to a universal mobile telecommunication system (UMTS), a WiMAX forum mobile system profile according to the IEEE Std 802.16-2009, an evolved UMTS terrestrial radio access (E-UTRA), and other wireless standards. The present invention will be described by exemplifying E-UTRA which is a wireless interface of 3rd generation partnership project (3GPP) long term evolution (LTE).

Figure 1A:
FIGS. 1a to 1d show several connection forms of a cloud radio access network (CRAN) that is supported by a common public radio interface (CPRI) standard.
Figure 1B:
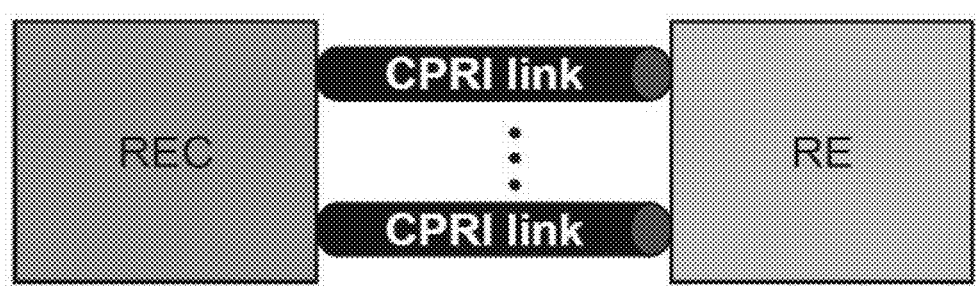
Figure 1C:
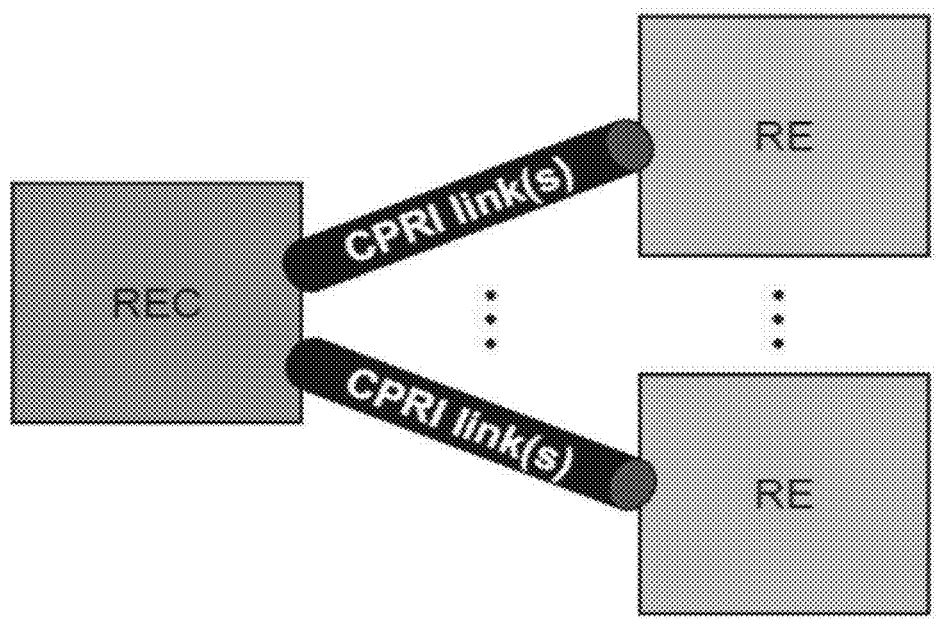
Figure 1D:
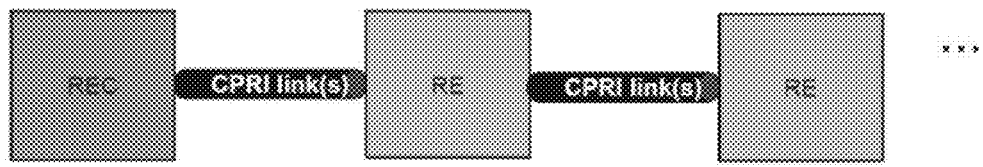
Figure 2:
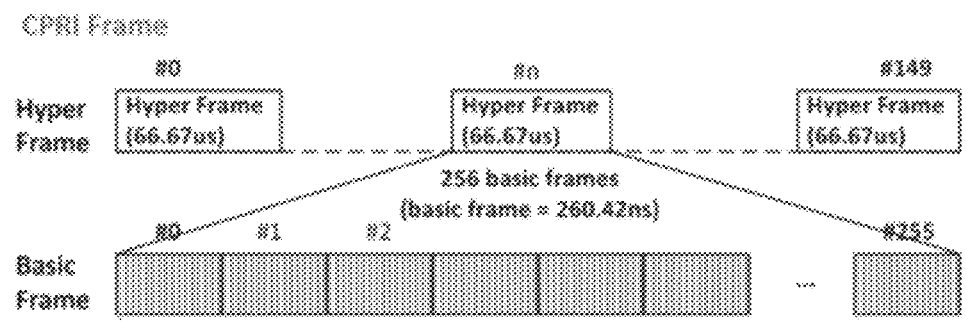
FIG. 2 is a structural diagram showing a CPRI frame and a sub channel.

FIG. 2 is a structural diagram showing a CPRI frame and subchannels. As described in FIG. 2, each CPRI wireless frame (node B frame) is 10 ms in length, and each hyper frame is 66.7 μs in length because one CPRI wireless frame consists of 150 hyper frames. One hyper frame consists of a total of 256 basic frames, such that each basic frame is 260.42 ns (=1/3.84 MHz) in length.

Figure 3:
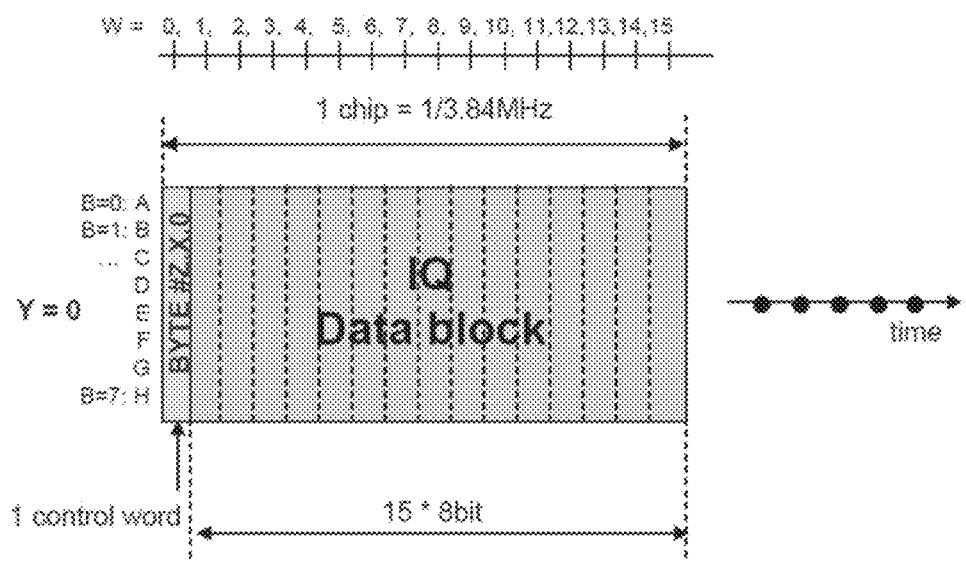
FIG. 3 is a structural diagram showing a basic frame for a CPRI line bit rate of 614.4 Mbps.

FIG. 3 is a structural diagram showing a basic frame for a CPRI line bit rate of 614.4 Mbps. As shown in FIG. 3, user data is contained as a digital baseband IQ stream in an IQ data block within a CPRI basic frame and then delivered, and the RU (RE) receives the user data, converts the received data into an analog signal, amplifies the analog signal, and then propagates the amplified analog signal (to terminals) over the air. CPRI control & management (C&M) data and synchronization information are delivered through a CPRI subchannel (specifically, the control word within the CPRI basic frame) and used only by the DU (REC) and RU (RE), irrespective of the LTE layer.

Each basic frame consists of one control word and 15 payloads, and a total of 256 control words in one hyper frame are gathered to form 64 subchannels. The length of one word (T) of one basic frame varies depending on the line bit rate of the CPRI link, and according to CPRI ver.4.2 (released in Sep. 29, 2010), the length ranges from 8 bits (1 byte) to 128 bits (16 bytes).

Figure 4:
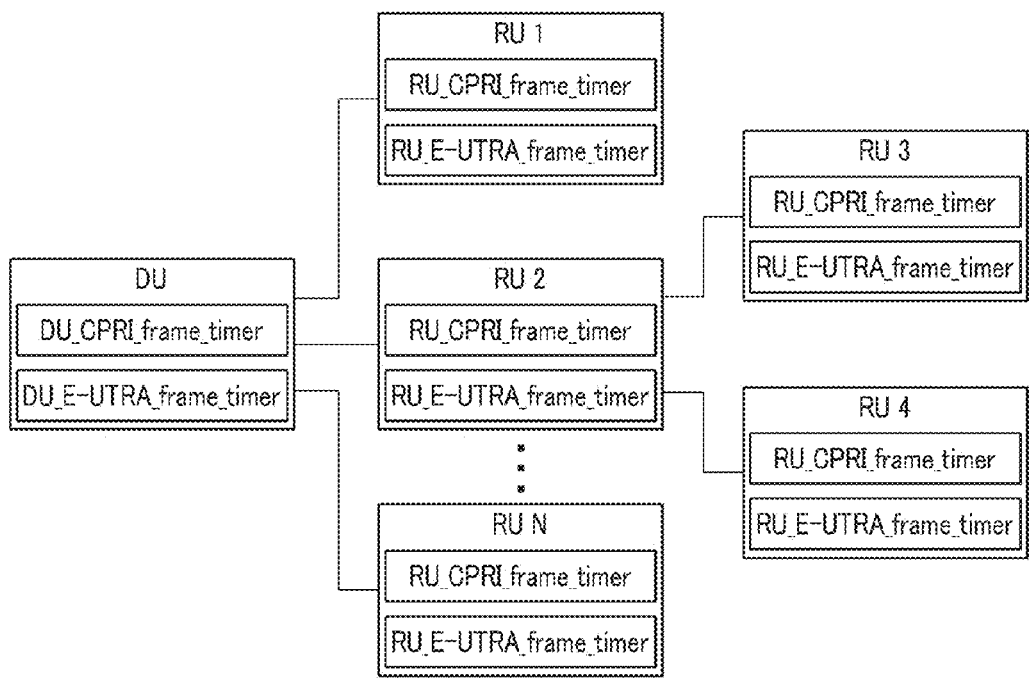
FIG. 4 is an exemplary diagram of the CRAN in which a method of controlling a time division duplexing (TDD) Tx/Rx switching timing according to an embodiment of the present invention.

FIG. 4 is an exemplary diagram of the CRAN in which a method for controlling a TDD Tx/Rx switching timing according to an embodiment of the present invention. As shown in FIG. 4, the CRAN, to which the method of controlling the TDD Tx/Rx switching timing according to an embodiment of the present invention may be applied, may be configured by connecting a plurality of RUs (REs) to one DU (REC), and FIG. 4 shows a configuration in which a plurality of RUs (REs) are connected to one DU (REC) by star and chain topologies.

The DU (REC) includes a DU_CPRI_frame_timer and a DU_E-UTRA_frame_timer, which are used to generate a CPRI frame and an E-UTRA frame, respectively. In addition, all the RUs (REs) include an RU_CPRI_frame_timer and an RU_E-UTRA_frame_timer. It is desirable that each DU_CPRI_frame_timer, DU_E-UTRA_frame_timer, RU_CPRI_frame_timer, and RU_E-UTRA_frame_timer are implemented as a timer having an error of less than 10 ns in order to finely control the TDD Tx/Rx switching timing.

Table 1 shows the content of 64 subchannels configured with one hyper frame within the CPRI wireless frame.

TABLE 1

| subchannel number Ns | purpose of subchannel | Xs = 0 | Xs = 1 | Xs = 2 | Xs = 3 |
|---|---|---|---|---|---|
| 0 | sync&timing | sync byte | HFN | BFN-low | BFN-high |
| 1 | slow C&M | slow C&M | slow C&M | slow C&M | slow C&M |
| 2 | L1 inband prot | version | startup | L1-reset-LOS | pointer p |
| 3 | reserved | reserved | reserved | reserved | reserved |
| 4 | Ctrl_AxC low Byte | Ctrl_AxC | Ctrl_AxC | Ctrl_AxC | Ctrl_AxC |
| 5 | Ctrl_AxC low Byte | Ctrl_AxC | Ctrl_AxC | Ctrl_AxC | Ctrl_AxC |
| 6 | Ctrl_AxC high Byte | Ctrl_AxC | Ctrl_AxC | Ctrl_AxC | Ctrl_AxC |
| 7 | Ctrl_AxC high Byte | Ctrl_AxC | Ctrl_AxC | Ctrl_AxC | Ctrl_AxC |
| 8 | reserved | reserved | reserved | reserved | reserved |
| ... | ... | ... | ... | ... | ... |
| 15 | reserved | reserved | reserved | reserved | reserved |
| 16 | vendor specific | vendor specific | vendor specific | vendor specific | vendor specific |
| ... | ... | ... | ... | ... | ... |
| p − 1 pointer p | vendor specific fast C&M | vendor specific fast C&M | vendor specific fast C&M | vendor specific fast C&M | vendor specific fast C&M |
| ... | ... | ... | ... | ... | ... |
| 63 | fast C&M | fast C&M | fast C&M | fast C&M | fast C&M |

When the DU (REC) and the respective RUs (REs) are connected by the CPRI link, each RU (RE) checks a signal boundary of the CPRI frame that is transmitted from the DU (REC) by using a synchronization signal of the CPRI frame received from the DU (REC), for example, a sync byte and hyper frame number (HFN) byte constituting subchannel #0 that is a sync&timing subchannel for each hyper frame, as shown in Table 1, and then determines a start timing of the RU_CPRI_frame_timer of the RU (RE) to perform an initial synchronization with DU_CPRI_frame_timer.

Figure 5:
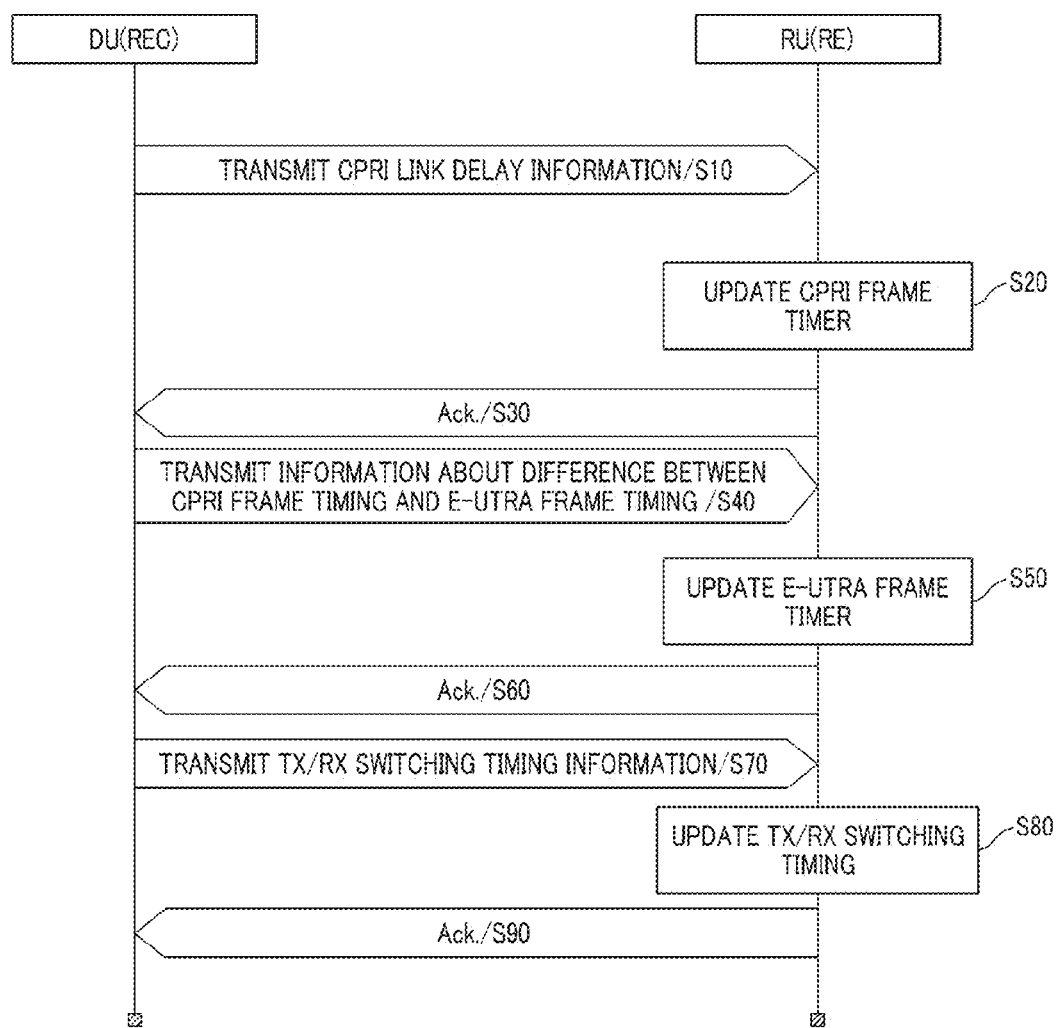
FIG. 5 is a timing chart illustrating a method of controlling a TDD Tx/Rx switching timing in the CRAN according to an embodiment of the present invention.

FIG. 5 is a timing chart illustrating a method for controlling a TDD Tx/Rx switching timing in the CRAN according to an embodiment of the present invention. As show in FIG. 5, according to the method of controlling the TDD Tx/Rx switching timing in the CRAN of the present invention, first, the DU (REC) detects in advance link delays between the DU (REC) and the respective RUs (REs) in order to match frame boundaries of a wireless frame signal transmitted from the RU (RE) and then transmits the link delays to the respective RUs (REs) (S10). In this case, the link delay may vary according to a type or length of a cable connecting the DU (REC) and RU (RE).

Figure 6:
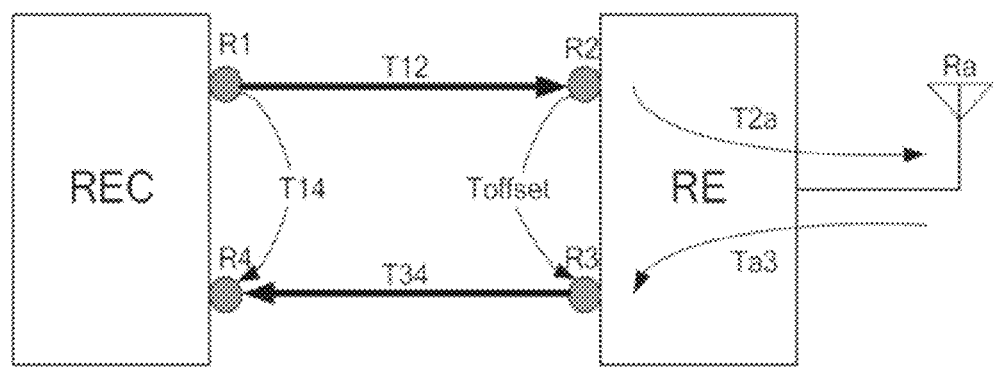
FIG. 6 is a diagram illustrating a reference point for correcting a link delay in a CRAN having a single hop configuration.

FIG. 6 is a diagram illustrating a reference point for correcting a link delay in the CRAN having a single hop configuration. As shown in FIG. 6, a reference point for correcting a cable (link) delay defined in the CPRI specification may be an input or output point of an apparatus, for example, a connector between the REC and RE.

In FIG. 6, the reference points R1 and R4 respectively indicate an output point and an input point of REC (DU), and the reference points R2 and R3 respectively indicate an output point and an input point of RE (RU). A reference number Ra indicates an antenna. $T_{12}$ indicates a delay of a downlink signal from the output point R1 of the REC (DU) to the input point R2 of the RE (RU), and $T_{34}$ indicates a delay of an uplink signal from the output point R3 of the RE (RU) to the input point R4 of the REC (DU).

$T_{offset}$ is a frame offset between an input signal of the reference R2 and an output signal of the reference point R3. Lastly, $T_{14}$ is a frame timing difference between the output signal of the reference R1 and the input signal of the reference R4. The REC (DU) may be aware in advance of the frame offset $T_{offset}$ of each RE (RU) by a report through an upper layer message from each RE (RU).

As such, the DU (REC) receives the frame offset $T_{offset}$ through an upper layer message from the RU (RE) and then calculates a link delay ($T_{12}=T_{34}$) using the delivered frame offset $T_{offset}$. The link delay ($T_{12}=T_{34}$) may be calculated by Equation 1 below:

(Equation 1)

$$T_{12}=T_{34}=(T_{14}-T_{offset})/2 \quad (1)$$

In an embodiment as shown in FIG. 4, a method of calculating a link delay in the CRAN having a multi-hop structure is also described in the CPRI standard, and since the present invention does not relate to a method of calculating a CPRI link delay, such detailed descriptions thereof will be omitted.

Referring back to FIG. 5, when receiving the link delay information from the DU (REC), the RU (RE) updates a CPRI frame timer in consideration of the link delay information (S20). For example, if a link delay between the DU (REC) and any RU (RE) is 50 μs, the RU (RE) corrects the CPRI_frame_timer by 50 μs in consideration of the link delay and then transmits an acknowledgement message Ack. to the DU (REC) (S30). Thus, the RU_CPRI_frame_timer is operated in synchronization with the DU_CPRI_frame_timer, with an error of less than 10 ns, and the DU (REC) repeats such operations with respect to all RUs (REs).

Although the length of one wireless frame (node B frame) is 10 ms, which is the same as that of one wireless frame in the E-UTRA, that is, the LTE standard, the wireless frame boundaries therebetween may not be matched. Considering this, the DU (REC) transmits information about a difference between the CPRI frame timing and the E-UTRA frame timing to all RUs (REs) (S40), and each RU (RE) updates E-UTRA frame timing information (S50) using the frame timing difference information, and then transmits an acknowledgement message Ack. to DU (REC) (S60).

Thus, the RU_E-UTRA_frame_timer is operated in synchronization with the DU_E-UTRA_frame_timer, with an error of less than 10 ns, and the DU (REC) repeats the operations on all RUs (REs). After completion of the operations, all of the RUs (REs) connected to the DU (REC) are operated using RU_CPRI_frame_timers and RU_E-UTRA_frame_timers in synchronization with the DU_CPRI frame-timer and DU_E-UTRA_frame_timer of the DU (REC).

Lastly, the DU (REC) transmits Tx/Rx switching timing information to each RU (RE) for each an antenna carrier AxC (S70), and each RU (RE) performs precise TDD Tx/Rx switching timing control with an error of less than 10 ns using the RU_CPRI_frame_timer and RU_E-UTRA_frame_timer. Here, one antenna carrier AxC refers to an amount of digital baseband U-plane data required by one independent antenna device to receive or transmit one carrier.

According to the method of controlling a TDD Tx/Rx switching timing in a CRAN of the present invention, it is possible to finely control a switching timing between transmission and reception of a TDD signal without an additional component added to the DU and RU.

The preferred embodiment of the method of controlling a TDD Tx/Rx switching timing in a CRAN environment of the present invention has been described in detail with reference to the accompanying drawings. However, the preferred embodiment is merely exemplary, and various modifications and changes are possible within the scope of the present invention. Accordingly, the scope of the present invention should be determined by the following claims.

That is, the embodiment has been described by exemplifying the CPRI timer and the E-UTRA timer, and may be applied to an OBSAI timer and a WiMAX timer. Thus in the appended claims, a CPRI_OBSAI_frame_timer indicates the CPRI_frame_timer or OBSAI_frame_timer, and also a WiMAX_E-UTRA_frame_timer indicates the WiMAX_frame_timer or E-UTRA_frame_timer.

What is claimed is:

1. A method of controlling a time division duplexing (TDD) Transmit/Receive (Tx/Rx) switching timing in a cloud radio access network (CRAN) in which at least one radio unit (RU) including a first RU frame timer for generating a first type of frame at the RU and a second RU frame timer for generating a second type of frame at the RU is connected with a digital unit (DU) having a first DU frame timer for generating the first type of frame at the DU and a second DU frame timer for generating the second type of frame at the DU, the method comprising:

determining, by the at least one RU, a boundary of a wireless frame signal transmitted from the DU to synchronize the first RU frame timer with the first DU frame timer, the DU being connected with the RU;

receiving, by the DU, from the at least one RU, a report comprising a frame offset, wherein the frame offset is received from the at least one RU through an upper layer message;

calculating, in advance by the DU, link delay information for the at least one RU based on their respective frame offset, wherein the link delay information is calculated based on $T_{12}=T_{34}=(T_{14}-T_{offset})/2$, and wherein:

(i) $T_{12}$ is a delay of a downlink signal from an output point (R1) of the DU to an input point (R2) of the at least one RU;

(ii) $T_{14}$ is a frame timing difference between the output point (R1) and an input point (R4) of the DU;

(iii) $T_{offset}$ is the frame offset between the input point (R2) and an output point (R3) of the at least one RU; and (iv) $T_{34}$ is a delay of an uplink signal from the output point (R3) of the at least one RU to the input point (R4) of the DU;

transmitting, by the DU, the link delay information to at least one RU;

updating, by the at least one RU, the first RU frame timer based on the link delay information received from the DU;

transmitting, by the at least one RU, a first acknowledgement message in response to the updating of the first RU frame timer;

updating, by the at least one RU, frame timing information for the second type of frame based on information about a difference between a timing for the first type of frame and a frame timing for the second type of frame, delivered from the DU transmitting, by the at least one RU, a second acknowledgement message in response to the updating of the frame timing information for the second type of frame; and controlling a TDD Tx/Rx switching timing by replacing Tx/Rx switching timing information for each antenna carrier (AxC) delivered from the DU to the first RU frame timer and the second RU frame timer;

wherein the first type of frame is a Common Public Radio Interface (CPRI) frame, and wherein the second type of frame is an Evolved Universal Terrestrial Radio Access (E-UTRA) frame.

2. The method of claim 1, wherein the determining of the boundary comprises checking the boundary of the wireless frame signal using a sync&timing subchannel for each hyper frame of the wireless frame signal transmitted from the DU.

3. The method of claim 1, wherein each of the first RU frame timer and second RU frame timer is configured using a timer with an error of less than 10 ns.

4. The method of claim 2, wherein each of the first RU frame timer and second RU frame timer is configured using a timer with an error of less than 10 ns.

* * * * *